W. S. REED,

Assignor to W. S. REED TOY COMPANY.

TOY LOCOMOTIVE.

No. 10,114. Reissued May 16, 1882.

Witnesses,
Herbert W. Stearns
James Compton

Inventor,
William S. Reed,
Per Norman W. Stearns,
Attorney.

N. PETERS, Photo-Lithographer, Washington, D. C.

UNITED STATES PATENT OFFICE.

WILLIAM S. REED, OF LEOMINSTER, MASSACHUSETTS, ASSIGNOR TO W. S. REED TOY COMPANY, OF SAME PLACE.

TOY LOCOMOTIVE.

SPECIFICATION forming part of Reissued Letters Patent No. 10,114, dated May 16, 1882.

Original No. 193,460, dated July 24, 1877. Application for reissue filed February 3, 1882.

*To all whom it may concern:*

Be it known that I, WILLIAM S. REED, of Leominster, in the county of Worcester and State of Massachusetts, have invented an Improvement in Knockdown or Combination Toys, of which the following is a full, clear, and exact description, reference being had to the accompanying drawings, making part of this specification, in which—

Figure 1:
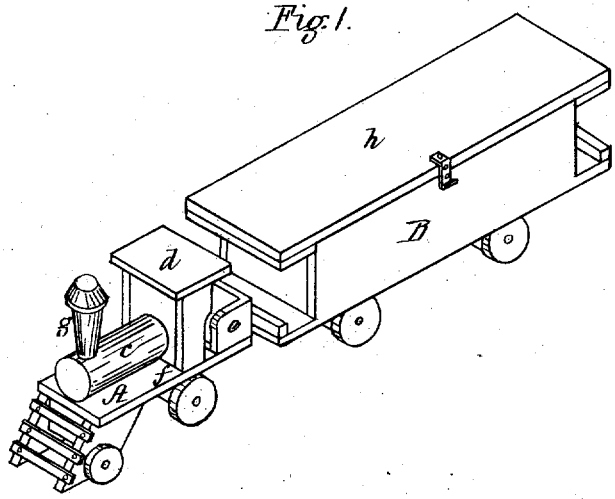
Figure 2:
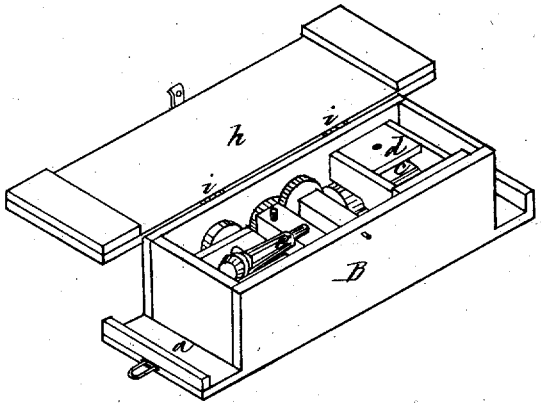

Figure 1 is a perspective view of a toy engine and car constructed in accordance with my invention. Fig. 2 represents the car when employed as a box for receiving the several portions of the engine taken apart, and the wheels and axles of the car.

My present invention consists in a toy vehicle provided with wheels, the several parts of said vehicle being so constructed that they can be readily detached and packed within a box or receptacle constituting one of the parts of the said wheeled toy when set up or put together, whereby space is economized and the expense of transportation reduced.

To enable others skilled in the art to understand and use my invention, I will proceed to describe the manner in which I have carried it out.

In the said drawings, A represents a locomotive-engine, and B a car, coupled together by a pin, *a*, passing through a link, *b*. The boiler *c* and front and rear portions, *d e*, of the cab are made detachable from the truck or platform *f* of the engine, and are held in their respective positions by dowel-pins entering corresponding holes, the bottom of the smoke-stack *g* fitting into an aperture in the boiler *c*, and being readily detachable therefrom. The car B is hollow, and its top or roof *h* is hinged at *i i*, by which construction a box is provided for holding the several portions of the engine when disconnected, and the wheels and axles of the car, which may be compactly stowed therein, as seen in Fig. 2, in which position the parts are always at hand ready for use, and thus prevented from being mislaid or lost. Furthermore, when the top or cover *h* is closed down the whole toy occupies but very little space, and can be conveniently carried from place to place, the separate box heretofore required and forming no portion of the toy being thus dispensed with and the cost thereof avoided.

A toy mounted on wheels made in accordance with my invention also possesses the additional advantage of being instructive to children, as the setting up of the several pieces gives an idea of construction and design, and tends to fix in the mind the relative position of the parts.

I do not confine my invention to a toy engine and car, as other toys on wheels may be constructed in a similar manner—for instance, a steamboat placed on wheels, in which case the hull will serve as a box or receptacle for holding the removable parts, such as transporting and paddle wheels and walking-beam.

I am aware of the existence of Patent No. 125,126 for toy wagon, in which the sides of the body are hinged to the bottom, and (with the wheels attached thereto and not removable therefrom) are folded together to economize space in packing; but my construction of wheeled toys admits of the separation of the constituent portions and the closer stowing thereof when they are to be transported or laid aside when not required for use.

I claim—

1. A knockdown or combination toy vehicle mounted on wheels, in which one portion serves as a box or receptacle for containing the other detached portions thereof, substantially as set forth.

2. A knockdown toy mounted on wheels, in which one portion serves as a box or receptacle for the remaining detached portions of the toy, as set forth.

Witness my hand this 28th day of October, 1881.

WILLIAM S. REED.

In presence of—
N. W. STEARNS,
H. W. STEARNS.